(12) United States Patent
Baba et al.

(10) Patent No.: US 11,804,602 B2
(45) Date of Patent: Oct. 31, 2023

(54) NEGATIVE ELECTRODE FOR LITHIUM ION SECONDARY BATTERY, AND LITHIUM ION SECONDARY BATTERY INCLUDING SAME

(71) Applicant: HONDA MOTOR CO., LTD., Tokyo (JP)

(72) Inventors: Ken Baba, Saitama (JP); Takeshi Fujino, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 327 days.

(21) Appl. No.: 17/200,925

(22) Filed: Mar. 15, 2021

(65) Prior Publication Data

US 2021/0305572 A1    Sep. 30, 2021

(30) Foreign Application Priority Data

Mar. 18, 2020 (JP) .................................. 2020-048274

(51) Int. Cl.
  *H01M 4/60*     (2006.01)
  *H01M 10/0525*  (2010.01)
  *H01M 4/02*     (2006.01)

(52) U.S. Cl.
  CPC ......... *H01M 4/60* (2013.01); *H01M 10/0525* (2013.01); *H01M 2004/027* (2013.01)

(58) Field of Classification Search
  CPC .................................................... H01M 4/60
  See application file for complete search history.

(56) References Cited

U.S. PATENT DOCUMENTS

2012/0082898 A1*  4/2012  Takahashi .......... H01M 4/133
                                              29/623.5
2021/0305572 A1*  9/2021  Baba ...................... H01M 4/60

FOREIGN PATENT DOCUMENTS

| CN | 104701521 A | * | 6/2015 | ............ H01M 10/28 |
| CN | 106463714 A | * | 2/2017 | ........ H01M 10/0525 |
| CN | 109560254 A | * | 4/2019 | |
| JP | H0864245    | * | 3/1996 | |
| JP | H0864245 A  | * | 3/1996 | |
| JP | H864245 A   | * | 8/1996 | |
| JP | 2011134572  | * | 7/2011 | |
| JP | 2011134572 A| * | 7/2011 | |
| JP | 2011134572 A| * | 7/2011 | |
| JP | 2011210694 A|   | 10/2011 | |

* cited by examiner

*Primary Examiner* — Scott J. Chmielecki
(74) *Attorney, Agent, or Firm* — CKC & Partners Co., LLC

(57) ABSTRACT

To provide a negative electrode for a lithium ion secondary battery having more improved durability than conventionally, and a lithium ion secondary battery including the same. A negative electrode for a lithium ion secondary battery including a negative electrode active material in which an organic molecule having a dielectric constant larger than that of an electrolyte solvent is chemically bonded, and a lithium ion secondary battery including the same.

Preferable examples of the organic molecule include a molecule having a relative dielectric constant of 90 or more at a frequency of 10 kHz, a molecule having a molecular structure that undergoes polarization in a single molecule or between molecules, a zwitter ion compound having a positive electric charge and a negative electric charge in one molecule, hydroxy acid, and a molecule having a molecular weight of 39 to 616.

7 Claims, 2 Drawing Sheets

Outermost surface side

NEGATIVE ELECTRODE FOR LITHIUM ION SECONDARY BATTERY, AND LITHIUM ION SECONDARY BATTERY INCLUDING SAME

This application is based on and claims the benefit of priority from Japanese Patent Application No. 2020-048274, filed on 18 Mar. 2020, the content of which is incorporated herein by reference.

BACKGROUND OF THE INVENTION

Field of the Invention

The present invention relates to a negative electrode for a lithium ion secondary battery, and a lithium ion secondary battery including the same.

Related Art

Conventionally, a lithium ion secondary battery using a positive electrode active material made of a lithium composite oxide on the surface of which a ferroelectric substance having a relative dielectric constant of 500 or more is sintered has been proposed (for example, see Patent Document 1).
In the lithium ion secondary battery of Patent Document 1, a surface being in contact with a non-aqueous electrolyte solution of the ferroelectric substance is positively charged, and a surface being in contact with the positive electrode active material is negatively charged. As a result, even at a low temperature, taking in an out of lithium ions in the positive electrode active material can be carried out smoothly, and the output property is improved.
Patent Document 1: Japanese Unexamined Patent Application, Publication No. 2011-210694

SUMMARY OF THE INVENTION

However, in the lithium ion secondary battery of Patent Document 1, in the vicinity of the outermost surface (edge surface) of crystal of graphite as the negative electrode active material, decomposition of a solvent proceeds, and a SEI (solid electrolyte interface) coating film grows.
Since the SEI coating film is made of a lithium compound, lithium consumed as a material of the SEI coating film cannot contribute to charge capacity as a lithium ion. Consequently, the capacity retention rate after durability test is deteriorated.
The present invention has been made in view of the above, and has an object to provide a negative electrode for a lithium ion secondary battery having more improved durability than conventionally, and a lithium ion secondary battery including the same.

(1) The present invention provides a negative electrode for a lithium ion secondary battery, including a negative electrode active material to which an organic molecule having a dielectric constant larger than that of an electrolyte solvent is chemically bonded.

According to the invention of (1), since an organic molecule having a dielectric constant larger than that of an electrolyte solvent is chemically bonded to the negative electrode active material, a SEI coating film formed on a lithium insertion surface such as graphite constituting the negative electrode active material is modified to have high polarity and fixed.

In particular, an organic molecule having a dielectric constant larger than that of the electrolyte solvent and expressing dielectric property can be dissolved in an electrolyte solution and are a low molecule, so that the organic molecule can enter an outermost surface (edge surface) of the negative electrode active material.

Therefore, a direct contact of a non-aqueous solvent in the electrolyte solution with the negative electrode active material is suppressed, and reductive decomposition can be suppressed.

Furthermore, desolvation of lithium salt in the electrolyte solution is promoted, and the electrolyte solution is stabilized, and accordingly, the decomposition of the electrolyte solution is suppressed.

Thus, consumption of lithium is reduced, and the capacity retention rate after durability test can be improved.

Therefore, the invention of (1) can provide a negative electrode for a lithium ion secondary battery in which durability has been more improved than conventionally.

(2) In the invention of (1), the organic molecule may have a relative dielectric constant of 90 or more at a frequency of 10 kHz.

(3) In the invention of (1) or (2), the organic molecule may have a molecular structure that undergoes polarization in a single molecule or between molecules.

(4) In the invention of any one of (1) to (3), the organic molecule may be a zwitter ion compound having a positive electric charge and a negative electric charge in one molecule.

(5) In the invention of any one of (1) to (4), the organic molecule may be a hydroxy acid.

(6) In the invention of any one of (1) to (5), the organic molecule may have a molecular weight of 89 to 616.

According to the invention of (2) to (6), an effect of the invention of (1) is achieved more reliably.

(7) Provided is a lithium ion secondary battery including a positive electrode, the negative electrode according to any one of (1) to (6), and a non-aqueous electrolyte including a non-aqueous solvent, wherein the non-aqueous electrolyte includes at least one lithium salt selected from the group consisting of $LiPF_6$, $LiBF_4$, $LiCF_3BF_3$, $LiBF_2(C_2O_4)$, $LiB(C_2O_4)_2$, $LiClO_4$, $LiCF_3SO_3$, $LiAsF_6$, $LiN(SO_2F)_2$, $LiN(SO_2CF)_2$, $LiN(SO_2C_2F_5)_2$, $LiN(SO_2C_4F_9)(SO_2CF_3)$, $LiC_4F_9SO_3$, $LiC(CF_3SO_2)_3$, $LiCF_8CO_2$, and $LiSbF_6$.

The invention of (7) can provide a lithium ion secondary battery having more improved durability than conventionally, because the negative electrode for a lithium ion secondary battery of any of one (1) to (6) is included.

The present invention can provide a negative electrode for a lithium ion secondary battery having more improved durability than conventionally, and a lithium ion secondary battery including the same.

DETAILED DESCRIPTION OF THE INVENTION

Figure 1:
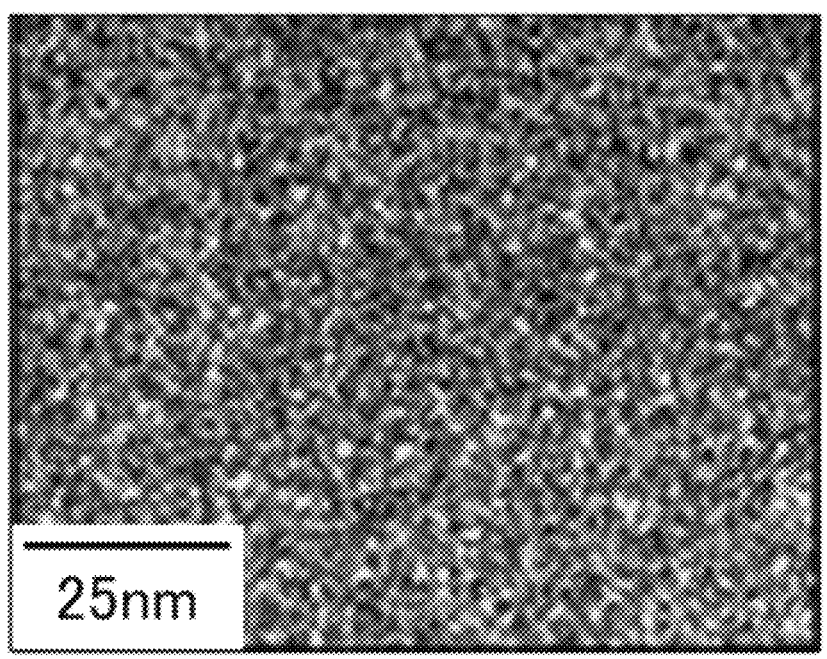
FIG. 1 is a view showing a result of a TEM-EDX elemental analysis of a cross-section of a negative electrode active material of Example 3.

One embodiment of the present invention will be described in detail.

The negative electrode for a lithium ion secondary battery according to this embodiment has more improved durability than conventionally, and therefore, includes a high capacity retention rate after durability test, and a low resistance increase rate.

The negative electrode for a lithium ion secondary battery according to this embodiment includes a negative electrode active material to which an organic molecule having a dielectric constant larger than that of an electrolyte solvent is chemically bonded.

The negative electrode for a lithium ion secondary battery according to this embodiment includes a current collector and a negative electrode active material layer formed on at least one surface of the current collector.

The negative electrode active material layer includes the negative electrode active material.

The current collector is not particularly limited, and conventionally known current collectors used for a lithium ion secondary battery can be used.

Examples of materials of the current collector include SUS, Ni, Cu, Ti, Al, baked carbon, a conductive polymer, conductive glass, an Al—Cd alloy, and the like.

Furthermore, examples of shapes of the current collector include a foil shape, a plate shape, a mesh shape, and the like.

A thickness thereof is not particularly limited, and, the thickness can be for example, 1 to 20 n.

The negative electrode active material layer includes a negative electrode active material as an essential component, and may include conventionally known components such as a conductive auxiliary agent and a binder as an arbitrary component.

As the negative electrode active material, any materials that can absorb and release lithium ions and show base electric potential as compared with the positive electrode may be used. In this embodiment, a negative electrode active material to which an organic molecule having a dielectric constant larger than that of an electrolyte solvent is chemically bonded can be used.

Specifically, graphite to which an organic molecule having a dielectric constant larger than that of an electrolyte solvent is chemically bonded is preferably used.

Herein, a chemical bonding between the organic molecule and the negative electrode active material is preferably chemical bonding generated by dehydration condensation with a hydroxyl group, a carboxyl group, a sulfonic acid group, a sulfinic acid group, a phosphoric acid group, or a phosphonic acid group.

Types of the chemical bonding is selected as a chemical bonding corresponding to preferable various organic molecules mentioned later.

In formation of the above chemical bonding, in order to accelerate a dehydration condensation reaction, an acid catalyst can be used.

Specific examples of the acid catalyst include inorganic acids such as a hydrochloric acid, a sulfuric acid, a nitric acid, hydrogen peroxide, and hydrogen fluoride, a sulfonic acid such as methane sulfonic acid, benzenesulfonic acid, and p-toluenesulfonic acid.

Furthermore, in order to remove by-products after dehydration condensation reaction, washing can be carried out with water, heated water, an inorganic acid, and other organic solvents such as ethanol, acetone, and hexane.

As the organic molecule, a molecule having a relative dielectric constant at a frequency of 10 kHz of 90 or more is preferably used. Since the organic molecule to be used in this embodiment has a dielectric constant larger than that of the electrolyte solvent, it is preferable that the relative dielectric constant at a frequency of 10 kHz is 90 or more because choice of the organic molecules is widened.

Furthermore, the organic molecule is more preferably a molecule having a molecular structure that undergoes polarization in a single molecule or between molecules is more preferable.

Examples of the molecule having a molecular structure that undergoes polarization in a single molecule or between molecules include metal salts including tartaric acid and derivatives thereof, $Li_2$ tartrate, $Na_2$ tartrate, LiNa tartrate, LiK tartrate, $K_2$ tartrate, NaK tartrate, barium tartrate, rubidium sodium tartrate, thallium tartrate, gadolinium tartrate, and bismuth tartrate oxide.

Note here that other tartrate-containing metals include bismuth, zinc, aluminum, tin, iron, copper, lead, and nickel.

These metal salts can be used by ionically bonding one or more types of metal in a molecule, or by mixing different metal salts.

Examples include potassium dihydrogen phosphate, imidazole carboxylic acid and metal salts thereof, benzimidazolecarboxylic acid and metal salts thereof, Chlorobenzimidazolecarboxylic acid and metal salts thereof, guanidines (specifically, guanidine aluminum sulfate), and glycines (specifically, triglycine sulfate).

These organic molecules may be used in mixture thereof.

Furthermore, the organic molecule is preferably a zwitter ion compound including a positive electric charge and a negative electric charge in one molecule, and metal salts thereof.

Examples of the zwitter ion compound including a positive electric charge and a negative electric charge in one molecule include amino acids (specifically, asparagine, glutamine, cysteine, glycine, proline, alanine, and valine), many compounds including acid and basic functional groups (specifically, bicine, tricine, sulfamic acid, lysergic acid, and psilocybin), and alkaloids.

Furthermore, the organic molecule is more preferably a hydroxy acid or a metal salt thereof.

The hydroxy acid is a compound having both of the functional groups, a hydroxy group and a carboxylic acid group, and has a molecular structure that undergoes polarization in the molecule.

Examples of the hydroxy acid include aliphatic hydroxy acid, specifically, lactic acid, tartronic acid, glyceric acid, and hydroxybutyric acid, and aromatic hydroxy acid, specifically, mandelic acid, (1,3-benzodioxole-5-yl) hydroxy acetic acid, DL-3,4-dihydroxy mandelic acid, and the like.

Furthermore, as the organic molecule, a molecule having a molecular weight of 89 to 616 is preferable.

Any small organic molecules having a molecular weight in a range of 89 to 616 are preferable because they easily enter the outermost surface (edge surface) of crystal of a graphite as the negative electrode active material.

By the way, in usual lithium ion secondary batteries, s SEI (solid electrolyte interface) coating film is formed on a surface of the negative electrode by intercalation of lithium ions into the negative electrode material in the initial charging process.

This SEI coating film does not allow electrons to pass but allows lithium ions to pass. The presence of the SEI coating film permits action as the negative electrode.

Furthermore, the SEI coating film having an appropriate thickness functions as the protective film, suppress the reaction between the negative electrode material and the electrolyte solution, and improves the cycle life of the battery.

At the time of initial charge, a so-called aging is generally performed, in which desired additives have been previously put into an electrolyte solution or an electrode mixture, a reaction between the electrode and the electrolyte solution is allowed to actively proceed after forming a battery, to form a SEI coating film on a surface of the electrode active material.

However, since the SEI coating film is made of a lithium compound, lithium consumed as a material of the SEI coating film cannot contribute to charge capacity as a lithium ion, irreversible capacity, that is, a difference between charge capacity and discharge capacity is increased at the time of initial charge.

Herein, it is also thought that the ferroelectric substance of the above-described Patent Document 1 is used not for a positive electrode active material but for a negative electrode active material. However, the ferroelectric substance of Patent Document 1 includes a large amount of oxide particles such as BTO($BaTiO_3$), and the oxide particle is a large molecule, and therefore cannot enter the inside of the negative electrode active material particle and cannot enter the outermost surface (edge face) that occupies most part of the SET formation.

On the contrary, in this embodiment, the above-described various organic molecules that express the dielectric property can be dissolved in an electrolyte solution and are low molecules, so that the organic molecules can enter the outermost surface (edge surface) of graphite crystals of the negative electrode active material.

Thus, since an organic molecule having a dielectric constant larger than that of an electrolyte solvent is chemically bonded to the negative electrode active material, a SEI coating film formed on a lithium insertion surface such as graphite constituting the negative electrode active material is modified to have high polarity and fixed. Therefore, direct contact of a non-aqueous solvent in the electrolyte solution with the negative electrode active material is suppressed, and reductive decomposition can be suppressed.

Furthermore, since desolvation of lithium salt in the electrolyte solution is promoted, and the electrolyte solution is stabilized, the decomposition of the electrolyte solution is suppressed.

Therefore, the negative electrode for a lithium ion secondary battery according to this embodiment can reduce consumption of lithium, and improve the capacity retention rate after durability test.

The method for producing the negative electrode for a lithium ion secondary battery according to this embodiment is not particularly limited, and usual methods in the field of this technology can be applied.

For example, a negative electrode paste including a negative electrode active material as an essential component is applied on the current collector, dried, and then rolled to obtain an electrode for a lithium ion secondary battery.

Note here that in producing the negative electrode active material, as described above, when an organic molecule and a negative electrode active material are chemically bonded to each other, an acidic catalyst is used for promoting the dehydration condensation, and after dehydration condensation reaction, washing with various solvents and the like can be carried out for removing by-product and the like.

Next, a lithium ion secondary battery according to this embodiment will be described.

The lithium ion secondary battery according to this embodiment includes a positive electrode, the above-described negative electrode for a lithium ion secondary battery according to this embodiment, a non-aqueous electrolyte including a non-aqueous solvent, and a separator.

The positive electrode includes a current collector, and a positive electrode active material layer formed on at least one surface of the current collector.

The positive electrode active material layer includes a positive electrode active material.

Examples of the current collector include metal materials such as SUS, Ni, Cr, Au, Pt, Al, Fe, Ti, Zn, and Cu.

Furthermore, examples of the shape of the current collector can include a foil shape, a plate shape, a mesh, and the like.

The thickness thereof is not particularly limited, and is, for example, 1 to 20 μm.

Examples of the positive electrode active material include $LiCoO_2$, $LiCoO_4$, $LiMn_2O_4$, $LiNiO_2$, $LiFePO_4$, lithium sulfide, sulfur, NCM, and the like.

As the positive electrode active material, a material showing noble electric potential as compared with the negative electrode may be selected from materials that can form an electrode.

The positive electrode active material layer includes a positive electrode active material as an essential component, and may include conventionally known components such as a conductive auxiliary agent and a binder as an arbitrary component.

The lithium ion secondary battery according to this embodiment uses a non-aqueous electrolyte including a non-aqueous solvent, as the electrolyte solution.

The electrolyte solution is not particularly limited, electrolyte solutions well-known as an electrolyte solution for a lithium ion secondary battery can be used.

As the non-aqueous solvent, a general solvent forming a general non-aqueous electrolyte solution can be used.

Examples of the non-aqueous solvents include solvents having a cyclic structure, for example, ethylene carbonate (EC), and propylene carbonate (PC), solvents having a chain structure, for example, dimethyl carbonate (DMC), ethyl methyl carbonate (FIC), and diethyl carbonate (DEC).

Furthermore, partially fluoridated fluoroethylene carbonate (FEC), difluoroethylene carbonate (DFEEC), and the like, can also be used.

Furthermore, well-known additives can be blended with an electrolyte solution. Examples of the additives include vinylene carbonate (VC), vinyl ethylene carbonate (VEC), propane sultone (PS), and the like.

Furthermore, as an electrolyte solution having high concentration, an ionic liquid may be used.

Examples of the ionic liquid include pyrrolidinium, piperidinium, imidazolium, and the like, including quaternary ammonium cation.

As the non-aqueous electrolyte, for example, at least one lithium salt selected from the group consisting of $LiPF_6$, $LiBF_4$, $LiCF_3BF_3$, $LiBF_2(C_2O_4)$, $LiB(C_2O_4)_2$, $LiClO_4$, $LiCF_3SO_3$, $LiAsF_6$, $LiN(SO_2F)_2$, $LiN(SO_2CF_3)_2$, $LiN(SO_2C_2F_5)_2$, $LiN(SO_2C_4F_9)(SO_2CF_3)$, $LiC_4F_9SO_3$, $LiC(CF_3SO_2)_3$, $LiCF_3CO_2$, and $LiSbF_6$ can be used.

Among them, $LiPF_6$, $LiBF_4$, or a mixture thereof is preferably used because of their high ionic conductivity, and high degree of dissociation.

Herein, LiPF$_6$ as a lithium salt in the electrolyte has low chemical stability and decomposes on contact with moisture to form HF.

On the contrary, for example, in the imide salt, since the alkylsulfonyl group bonded to the central nitrogen has a very strong electron-withdrawing property, the negative charge on nitrogen is largely delocalized.

Therefore, the lithium ion dissociation degree is very high, and very stable thermally and chemically.

Thus, when an electrolyte, for example, an imide salt and LiFSI, in which chemical stability has been enhanced, is mixed to be used together with LiPF$_6$, the HF amount of the electrolyte solution can be reduced.

Thus, an organic molecule is bonded to the negative electrode active material of this embodiment, and decomposition of the bonded organic molecule is suppressed, and the capacity retention rate after durability test is further improved.

As the separator, conventionally well-known separators can be used.

For example, non-woven fabric in which three layers of polypropylene/polyethylene/polypropylene are laminated can be used.

The method for producing a lithium ion secondary battery according to this embodiment is not particularly limited, and can use usual methods in the field of this technology.

Since the lithium ion secondary battery according to this embodiment includes the negative electrode for a lithium ion secondary battery according to this embodiment, the similar effect to the effect by the above-described negative electrode for a lithium ion secondary battery according to this embodiment can be achieved.

Note here that the present invention is not limited to the above-mentioned embodiment, and modifications and improvements within a scope that can achieve the object of the present invention are included in the present invention.

EXAMPLES

Next, Examples of the present invention will be described, but the present invention is not to be limited thereto.

<Positive Electrode>

Examples 1 to 10 and Comparative Examples 1 to 3 use the same positive electrode.

The positive electrode was produced according to the following procedure.

Firstly, the acetylene black dispersion liquid as a conductive auxiliary agent, and polyvinylidene fluoride (PVDF) as a binder were weighed at a predetermined ratio and mixed with each other, and the obtained mixture was dispersed by a rotation-revolution mixer.

Next, a predetermined amount of a nickel-cobalt-manganese ternary system positive electrode active material NCM622 was added thereto, and the obtained product was mixed using a planetary mixer.

Thereafter, N-methyl-N-pyrrolidinone (NMP) was added to the mixture to produce a positive electrode paste.

Next, the produced positive electrode paste was applied to a current collector made of aluminum and dried, and then pressed by a roll press. The pressed product was dried in vacuum at 120° C. to obtain a positive electrode plate.

The obtained positive electrode plate was punched into 30 mm×40 nm, and the punched positive electrode plate was used as a positive electrode.

Note here that a mass ratio of the positive electrode active material, acetylene black, and PVDF in the positive electrode was 94.0:4.1:1.9 as shown in Table 3.

Furthermore, a thickness of each of the obtained positive electrodes was 70 μm.

<Negative Electrode Active Material>

Example 1

Potassium sodium tartrate as an organic molecule was weighed in a mass ratio of 96.2:0.3 with respect to graphite, stirred in an aqueous solution for one hour, and then concentrated.

Next, the obtained product was dried under reduced pressure at 150° C.×12 hours and then washed with water to obtain a negative electrode active material in which potassium sodium tartrate was chemically bonded to a surface of graphite in the mass ratio mentioned above.

Example 2

Potassium sodium tartrate as an organic molecule was weighed in a mass ratio of 96.0:0.5 with respect to graphite, stirred in an aqueous solution for one hour, and then concentrated.

Next, the obtained product was dried under reduced pressure at 150° C.×12 hours and then washed with water to obtain a negative electrode active material in which potassium sodium tartrate was chemically bonded to a surface of graphite in the mass ratio mentioned above.

Example 3

Potassium sodium tartrate as an organic molecule was weighed in a mass ratio of 95.5:1.0 with respect to graphite, stirred in an aqueous solution for one hour, and then concentrated.

Next, the obtained product was dried under reduced pressure at 150° C.×12 hours, and then washed with water to obtain a negative electrode active material in which potassium sodium tartrate was chemically bonded to a surface of graphite in the mass ratio mentioned above.

Example 41

Benzimidazolecarboxylic acid as an organic molecule was weighed in a mass ratio of 96.2:0.3 with respect to graphite, stirred in an aqueous solution for one hour, and then concentrated.

Next, the obtained product was dried under reduced pressure at 150° C.×12 hours to obtain a negative electrode active material in which benzimidazolecarboxylic acid was chemically bonded to a surface of graphite in the mass ratio mentioned above.

Example 51

Benzimidazolecarboxylic acid as an organic molecule was weighed in a mass ratio of 96.0:0.5 with respect to graphite, stirred in an aqueous solution for one hour, and then concentrated.

Next, the obtained product was dried under reduced pressure at 150° C.×12 hours to obtain a negative electrode active material in which benzimidazolecarboxylic acid was chemically bonded to a surface of graphite in the mass ratio mentioned above.

Example 61

Chlorobenzimidazolecarboxylic acid as an organic molecule was weighed in a mass ratio of 96.2:0.3 with respect to graphite, stirred in an aqueous solution for one hour, and then concentrated.
Next, the obtained product was dried under reduced pressure at 150° C.×12 hours to obtain a negative electrode active material in which chlorobenzimidazolecarboxylic acid was chemically bonded to a surface of graphite in the mass ratio mentioned above.

Example 7

Imidazolecarboxylic acid as an organic molecule was weighed in a mass ratio of 96.2:0.3 with respect to graphite, stirred in an aqueous solution for one hour, and then concentrated.
Next, the obtained product was dried under reduced pressure at 150° C.×12 hours to obtain a negative electrode active material in which imidazolecarboxylic acid was chemically bonded to a surface of graphite in the mass ratio mentioned above.

Example 8

Tartrate dioxide dibismuth hydrate as an organic molecule was weighed in a mass ratio of 96.4:0.1 with respect to graphite, stirred in an aqueous solution for one hour, and then concentrated.
Next, the obtained product was dried under reduced pressure at 150° C.×12 hours, and then washed with water to obtain a negative electrode active material in which tartrate dioxide dibismuth hydrate was chemically bonded to a surface of graphite in the mass ratio mentioned above.

Example 9

Alanine and mandelic acid as an organic molecule were weighed in a mass ratio of 95.5:0.4:0.6 with respect to graphite, stirred in an aqueous solution for one hour, and then concentrated.
Next, the obtained product was dried under reduced pressure at 150° C.×12 hours to obtain a negative electrode active material in which alanine and mandelic acid were chemically bonded to a surface of graphite in the mass ratio mentioned above.

Example 10

Potassium sodium tartrate as an organic molecule was weighed in a mass ratio of 95.5:1.0 with respect to graphite, stirred in an aqueous solution for one hour, and then concentrated.
Next, the obtained product was dried under reduced pressure at 150° C.×12 hours, and then washed with water to obtain a negative electrode active material in which potassium sodium tartrate was chemically bonded to a surface of graphite in the mass ratio mentioned above.

Comparative Example 1

Graphite was used as a negative electrode active material.

Comparative Example 2

Polyacrylic acid was weighed in a mass ratio of 95.5:1.0 with respect to graphite, stirred in an aqueous solution for one hour, and then concentrated.
Next, the obtained product was dried under reduced pressure at 150° C.×12 hours to obtain a negative electrode active material in which polyacrylic acid was chemically bonded to a surface of graphite in the mass ratio mentioned above.

Comparative Example 3

Graphite was used as a negative electrode active material, and in production of the negative electrode, benzimidazolecarboxylic acid was added to graphite in a mass ratio of 94.5:2.0 to produce a negative electrode, and the produced negative electrode was evaluated.

<Negative Electrode>

Negative electrode was produced according to the following procedure using each of the negative electrode active materials obtained in Examples 1 to 10 and Comparative Examples 1 to 3.
Firstly, carboxymethylcellulose (CMC) as a binder, and acetylene black as a conductive auxiliary agent were mixed with each other, and the obtained mixture was dispersed using a planetary mixer.
Next, each of the negative electrode active materials obtained in Examples 1 to 10 and Comparative Examples 1 to 3 was added thereto and mixed with each other, and the obtained mixture was dispersed again using a planetary mixer.
Thereafter, a distribution solvent and styrene-butadiene rubber (SBR) as a binder were added thereto and dispersed to produce a negative electrode paste.
Next, the negative electrode paste was applied to a current collector made of copper and dried, and then pressed by a roll press. The pressed product was dried in vacuum at 100° C. to obtain a negative electrode plate.
The obtained negative electrode plate was punched into 34 mm×44 nm, and the punched negative electrode plate was used as a negative electrode.
Note here that a mass ratio of an organic molecule in the negative electrode, the negative electrode active material, acetylene black, CMC, and SBR in the negative electrode was 94.0:4.1:1.9 as shown in Table 3.
Furthermore, a thickness of each of the obtained negative electrodes was 90 μm.

<Lithium Ion Secondary Battery>

A positive electrode, a separator, and a negative electrode were sequentially laminated, and the laminate was housed in a bag processed by heat-sealing an aluminum laminate for secondary battery manufactured by Dai Nippon Printing Co., Ltd.
Next, an electrolyte solution was added to the inside of the laminate to obtain lithium ion secondary batteries of Examples 1 to 10 and Comparative Examples 1 to 3.
Note here that as a separator, non-woven fabric in which three layers of polypropylene/polyethylene/polypropylene were laminated (thickness: 20 μm, percentage of voids: 45%) was used.
Furthermore, as the electrolyte solution, electrolyte solutions shown in Tables 1 and 4 were used.

<TEM-EDX Analysis>

Cross-sections of the negative electrode active materials for the negative electrode active material obtained in Example 3 and the negative electrode active material obtained in Comparative Example 1 were prepared by FIB processing, and subjected to cross-sectional observation by TEM.

Furthermore, at the same time of the cross-sectional observation by TEM, the elemental analysis of the cross-sections was performed by TEM-EDX ("ARM200F" manufactured by JEOL Ltd.).

Figure 2:
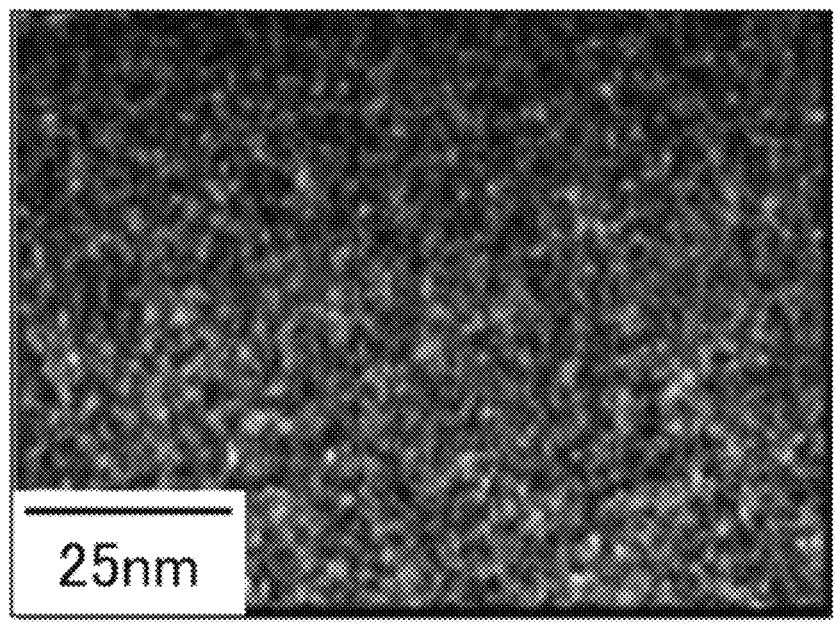
FIG. 2 is a view showing a result of a TEM-EDX elemental analysis of a cross-section of a negative electrode active material of Comparative Example 1.

Results are shown in FIGS. 1 and 2.

<Charge-Discharge Test>

Lithium ion secondary batteries obtained in Examples 1 to 10 and Comparative Examples 1 to 3 were subjected to a charge-discharge test. In the initial charge-discharge test, the battery was charged at a C rate of 0.1 C up to 4.2 V, and discharged at 0.1 C up to 2.5 V. Thereafter, the battery was charged at 0.2 C up to 4.2 V, and discharged at 0.25 C up to 2.5 V.

From the results of the charge-discharge test, the initial cell capacity and the cell capacity after durability test were calculated, and the calculated results are shown in Table 1. Furthermore, when the discharge current value at 0.25 C is 100, the capacity retention rate after durability test that is a ratio of the cell capacity after durability test to the initial cell capacity was calculated, and the calculation result is shown in Table 1.

Similarly, from the results of the charge-discharge test, the initial cell internal resistance and the cell internal resistance after durability test were calculated, and the calculation results are shown in Table 1. Specifically, a gradient of an approximate straight line obtained by plotting voltage values with respect to electric current values was calculated as the internal resistance. Furthermore, the resistance increase rate after durability test as a ratio of the cell internal resistance after durability test to the initial cell internal resistance was calculated, and the calculation results are shown in Table 1.

TABLE 2

| Organic molecule | | Molecular weight | Relative dielectric constant |
|---|---|---|---|
| No. 1 | Potassium sodium tartrate | 210 | 566 |
| No. 2 | Benzimidazolecarboxylic acid | 162 | 180 |
| No. 3 | Chlorobenzimidazolecarboxylic acid | 210 | 360 |
| No. 4 | Polyacrylic acid | 5000 | 5 |
| No. 5 | Imidazolecarboxylic acid | 112 | 90 |
| No. 6 | Tartrate dioxide dibismuth hydrate | 616 | — |
| No. 7 | Alanine | 89 | 100 |
| No. 8 | Mandelic acid | 152 | 100 |
| Reference | Electrolyte solvent EC:DMC:MEC = 3:4:4 vol % | — | 23 |

Note here that the relative dielectric constant in Table 2 is a relative dielectric constant at a frequency of 10 kHz.

TABLE 3

| Composition of positive electrode (mass %) | Positive electrode active material | 94.0 |
|---|---|---|
| | Acetylene black | 4.1 |
| | PVDF | 1.9 |

TABLE 1

| | | Example | | | | | | | | | | Comparative Example | | |
|---|---|---|---|---|---|---|---|---|---|---|---|---|---|---|
| | | 1 | 2 | 3 | 4 | 5 | 6 | 7 | 8 | 9 | 10 | 1 | 2 | 3 |
| Organic molecule | | No.1 | No.1 | No.1 | No.2 | No.2 | No.3 | No.5 | No.6 | No.7 + 8 | No.1 | — | No.4 | No.2 |
| Presence or absence of chemical bond | | Present | Present | Present | Present | Present | Present | Present | Present | Present | Present | Absent | Present | Absent |
| Composition of electrolytic solution | | A | A | A | A | A | A | A | A | A | B | A | A | A |
| Composition of negative electrode (mass %) | Organic molecule | 0.3 | 0.5 | 1.0 | 0.3 | 0.5 | 0.3 | 0.3 | 0.1 | 1.0 | 1.0 | 0.0 | 1.0 | 2.0 |
| | Negative electrode active material | 96.2 | 96.0 | 95.5 | 96.2 | 96.0 | 96.2 | 96.2 | 96.4 | 95.5 | 95.5 | 96.5 | 95.5 | 94.5 |
| | Acetylene black | 1.0 | 1.0 | 1.0 | 1.0 | 1.0 | 1.0 | 1.0 | 1.0 | 1.0 | 1.0 | 1.0 | 1.0 | 1.0 |
| | CMC | 1.0 | 1.0 | 1.0 | 1.0 | 1.0 | 1.0 | 1.0 | 1.0 | 1.0 | 1.0 | 1.0 | 1.0 | 1.0 |
| | SBR | 1.5 | 1.5 | 1.5 | 1.5 | 1.5 | 1.5 | 1.5 | 1.5 | 1.5 | 1.5 | 1.5 | 1.5 | 1.5 |
| Initial | Cell capacity [mAh] | 42.3 | 42.1 | 41.8 | 42.1 | 41.3 | 42.0 | 42.1 | 42.6 | 41.7 | 41.7 | 42.5 | 41.0 | 41.5 |
| | Cell internal resistance [Ω] | 1.0 | 1.0 | 1.0 | 1.0 | 1.0 | 1.0 | 1.0 | 1.0 | 1.1 | 1.0 | 1.0 | 1.2 | 1.1 |
| After durability test | Cell capacity [mAh] | 35.3 | 35.2 | 35.1 | 34.9 | 34.3 | 34.9 | 34.7 | 34.7 | 34.2 | 35.5 | 34.3 | 32.0 | 33.2 |
| | Cell internal resistance [Ω] | 1.30 | 1.32 | 1.29 | 1.40 | 1.40 | 1.40 | 1.43 | 1.40 | 1.50 | 1.26 | 1.67 | 2.00 | 1.80 |
| Capacity retention rate after durability test | | 83.3% | 83.6% | 84.0% | 82.8% | 83.0% | 83.1% | 82.4% | 81.5% | 82.0% | 85.1% | 80.8% | 78.0% | 80.1% |
| Resistance increase rate after durability test | | 130% | 132% | 129% | 140% | 140% | 140% | 143% | 140% | 136% | 126% | 167% | 165% | 164% |

All compositions of positive electrode are those shown in Table 3.

TABLE 4

| Electrolytic solution | Composition |
| --- | --- |
| A | 1.2MLiPF6 EC/EMC/DMC(3/3/4) + PS1 % + VC1 % |
| B | .0MLiPF6 + 0.2MLiFSI EC/EMC/DMC(3/3/4) + PS1 % + VC1 % |

<Consideration>

FIG. 1 is a view showing a TEM-FDX analysis result of a cross-section of a negative electrode active material of Example 3.

FIG. 2 is a view showing a TEM-EDX analysis result of a cross-section of a negative electrode active material of Comparative Example 1.

In more detail, both FIG. 1 and FIG. 2 were obtained by performing the cross-sectional observation by TEM-EDX and measurement of carbon amount distribution in each negative electrode active material before durability test.

As is apparent from FIG. 2, in the negative electrode active material of Comparative Example 1, it is shown that the contrast at the outermost surface (edge surface) side is low.

This means that the outermost surface (edge surface) side has low density of carbon, and, therefore, is in a non-dense state.

On the contrary, in the negative electrode active material of Example 3, that is, in the negative electrode active material in which a potassium sodium tartrate is bonded to the surface of graphite, since the contrast is uniform as a whole, an entire part including the outermost surface (edge surface) side is in a dense state.

This is because potassium sodium tartrate is bonded to the outermost surface (edge surface) side of the organic molecule.

Therefore, this result demonstrates that potassium sodium tartrate of the organic molecule is bonded to the outermost surface (edge surface) of the negative electrode active material in Example 3.

Similarly in the other Examples, it is demonstrated that each organic molecule is bonded to the outermost surface (edge surface) of the negative electrode active material.

As is apparent from the description in Tables 1 to 4, it is demonstrated that according to the lithium ion secondary batteries of Example 1 to 10 using a negative electrode for a lithium ion secondary battery including a negative electrode active material in which an organic molecule having a dielectric constant larger than that of an electrolyte solvent is chemically bonded, a higher capacity retention rate after durability test is obtained, and the resistance increase rate after durability test can be suppressed as compared with any one of Comparative Example 1 which does not use an organic molecule, Comparative Example 2 in which an organic molecule having smaller dielectric constant than that of electrolyte solvent is chemically bonded, and Comparative Example 3 in which an organic molecule is not chemically bonded.

Similarly, it is demonstrated that lithium ion secondary batteries of Examples 1 to 10 using an organic molecule having a relative dielectric constant at a frequency of 10 kHz of 90 or more, an organic molecule having a molecular structure that undergoes polarization in a single molecule or between molecules, a zwitter ion compound having a positive electric charge and a negative electric charge in one molecule, hydroxy acid, or an organic molecule having a molecular weight of 89 to 616, a higher capacity retention rate after durability test is obtained, and the resistance increase rate after durability test can be suppressed as compared with any one of Comparative Example 1 which does not use an organic molecule, Comparative Example 2 in which an organic molecule having smaller dielectric constant than that of electrolyte solvent is chemically bonded, and Comparative Example 3 in which an organic molecule is not chemically bonded.

Furthermore, the results of Example 8 demonstrate the following. $LiPF_6$ as a lithium salt in the electrolyte solution has low chemical stability and decomposes on contact with moisture to generate HF.

On the contrary, for example, in the imide salt, the alkylsulfonyl group bonded to the central nitrogen has a very strong electron-withdrawing property, so that the negative charge on nitrogen is largely delocalized.

Therefore, the degree of dissociation of lithium ion is very high, and very stable thermally and chemically.

According to Example 8, when an electrolyte such as an imide salt and LiFSI, in which chemical stability has been enhanced, is mixed and used together with $LiPF_6$, the HF amount of the electrolyte solution can be reduced. To the negative electrode active material of this Example, an organic molecule is bonded, and decomposition of the bonded organic molecule is suppressed, and the capacity retention rate after durability test can be further improved.

What is claimed is:

1. A negative electrode for a lithium ion secondary battery, comprising a negative electrode active material to which an organic molecule having a dielectric constant larger than that of an electrolyte solvent is chemically bonded,
    wherein content of the organic molecule in a negative electrode active material layer comprising the negative electrode active material is between 0.1 and 1.0% by mass.

2. The negative electrode for a lithium ion secondary battery according to claim 1, wherein the organic molecule has a relative dielectric constant of 90 or more at a frequency of 10 kHz.

3. The negative electrode for a lithium ion secondary battery according to claim 1, wherein the organic molecule has a molecular structure that undergoes polarization in a single molecule or between molecules,
    wherein the organic molecule is at least one selected from the group consisting of $Li_2$ tartrate, Na tartrate, LiNa tartrate, Lik tartrate, $K_2$ tartrate, NaK tartrate, barium tartrate, rubidium sodium tartrate, thallium tartrate, potassium dihydrogen phosphate, imidazole carboxylic acid and metal salts thereof, benzimidazolecarboxylic acid and metal salts thereof, chlorobenzimidazolecarboxylic acid and metal salts thereof, guanidine aluminum sulfate and triglycine sulfate.

4. The negative electrode for a lithium ion secondary battery according to claim 1, wherein the organic molecule is a zwitter ion compound having a positive electric charge and a negative electric charge in one molecule.

5. The negative electrode for a lithium ion secondary battery according to claim 1, wherein the organic molecule is a hydroxy acid.

6. The negative electrode for a lithium ion secondary battery according to claim 1, wherein the organic molecule has a molecular weight of 89 to 616.

7. A lithium ion secondary battery comprising:
    a positive electrode;
    the negative electrode according to claim 1; and
    a non-aqueous electrolyte including a non-aqueous solvent, wherein the non-aqueous electrolyte includes at least one lithium salt selected from the group consisting of $LiPF_6$, $LiBF_4$, $LiCF_3BF_3$, $LiBF_2(C_2O_4)$, $LiB(C_2O_4)_2$, $LiClO_4$, $LiCF_3SO_3$, $LiAsF_6$, $LiN(SO_2F)_2$, $LiN(SO_2CF_3)_2$, $LiN(SO_2C_2F_5)_2$, $LiN(SO_2C_4F_9)(SO_2CF_3)$, $LiC_4F_9SO_3$, $LiC(CF_3SO_2)_3$, $LiCF_3CO_2$, and $LiSbF_6$.

* * * * *